(12) United States Patent
Kim et al.

(10) Patent No.: US 12,468,256 B2
(45) Date of Patent: Nov. 11, 2025

(54) HOLOGRAPHIC CAMERA SYSTEM

(71) Applicants: Kyungpook National University Industry-Academic Cooperation Foundation, Daegu (KR); ELECTRONICS AND TELECOMMUNICATIONS RESEARCH INSTITUTE, Daejeon (KR)

(72) Inventors: Hak-Rin Kim, Daegu (KR); Tae-Hyun Lee, Daegu (KR); Ki Hong Choi, Daejeon (KR); Kee Hoon Hong, Daejeon (KR); Joong Ki Park, Daejeon (KR)

(73) Assignees: Kyungpook National University Industry-Academic Cooperation Foundation, Daegu (KR); Electronics and Telecommunications Research Institute, Daejeon (KR)

( * ) Notice: Subject to any disclaimer, the term of this patent is extended or adjusted under 35 U.S.C. 154(b) by 670 days.

(21) Appl. No.: 17/686,917

(22) Filed: Mar. 4, 2022

(65) Prior Publication Data

US 2022/0283541 A1  Sep. 8, 2022

(30) Foreign Application Priority Data

Mar. 5, 2021 (KR) .................. 10-2021-0029454

(51) Int. Cl.
*G02B 5/30* (2006.01)
*G02B 27/28* (2006.01)
*G03H 1/04* (2006.01)

(52) U.S. Cl.
CPC ......... *G03H 1/0443* (2013.01); *G02B 5/3083* (2013.01); *G02B 27/286* (2013.01);
(Continued)

(58) Field of Classification Search
CPC .. G03H 1/02; G03H 1/04; G03H 1/06; G03H 1/0443; G03H 2001/0216;
(Continued)

(56) References Cited

U.S. PATENT DOCUMENTS 6,269,565 B1 * 8/2001 Inbar .................... G02B 27/024
40/361
10,921,752 B2 * 2/2021 Min ..................... G03H 1/0443
(Continued)

FOREIGN PATENT DOCUMENTS

| CN | 108459485 A | 8/2018 |
| CN | 111580371 A | 8/2020 |

(Continued)

OTHER PUBLICATIONS

Myung K. Kim, Full Color Natural Light Holographic Camera, 21 Optics Express 9636-9642 (2013). (Year: 2013).*

(Continued)

*Primary Examiner* — Jie Lei
(74) *Attorney, Agent, or Firm* — KDW Firm PLLC (57) ABSTRACT

A holographic camera system includes an imaging lens, a polarizer configured to circularly polarize light incident from the imaging lens, a geometric phase lens with a phase delay of λ/4, and an image sensor configured to replicate an interference pattern through self-interference of light output from the geometric phase.

8 Claims, 6 Drawing Sheets

(52) U.S. Cl.
CPC .............. *G03H 2001/0447* (2013.01); *G03H 2001/0452* (2013.01); *G03H 2222/31* (2013.01); *G03H 2222/45* (2013.01); *G03H 2223/22* (2013.01)

(58) Field of Classification Search
CPC ... G03H 2001/0436; G03H 2001/0447; G03H 2001/0452; G03H 2222/31; G03H 2222/45; G03H 2223/17; G03H 2223/20; G03H 2223/22; G03H 2223/26; G02B 5/1876; G02B 5/3083; G02B 27/28; G02B 27/286; G02B 3/0087; G02B 9/04; G02B 5/30; G02B 5/32; G02B 8/04; G02F 1/1395; G02F 1/13471
USPC ......... 359/30, 15, 32, 33, 35, 443, 460, 462, 359/629, 902
See application file for complete search history.

(56) References Cited

U.S. PATENT DOCUMENTS

| | | | | |
|---|---|---|---|---|
| 2020/0264441 | A1* | 8/2020 | Lee ...................... | G02B 5/3025 |
| 2021/0255584 | A1* | 8/2021 | Choi ................... | H04N 23/843 |
| 2022/0163918 | A1* | 5/2022 | Brooker ............... | G03H 1/0005 |
| 2024/0027960 | A1* | 1/2024 | Kim ........................ | G03H 1/06 |

FOREIGN PATENT DOCUMENTS

| | | | |
|---|---|---|---|
| JP | 201914520 | A | 8/2019 |
| KR | 1020190092151 | A | 7/2019 |
| KR | 20190099859 | A * | 8/2019 |
| KR | 1020200101044 | A | 8/2020 |
| WO | 2021003380 | A1 | 1/2021 |

OTHER PUBLICATIONS

Myung K. Kim, Holographic Camera Uses Full-color Natural Light, OPTICS & Photonics News 27 (2013). (Year: 2013).*
Jihwan Kim et al, Fabrication of Ideal Geometric-phase Holograms with Arbitrary Wavefronts, 2 Optica 958-964 (2015). (Year: 2015).*
Weiwei Wan et al., Full-color Plasmonic Metasurface Holograms, 10 ACS Nano 10671-10680 (2016). (Year: 2016).*
Hee-Jin Choi et al., Compensation of a Chromatic Aberration of a Geometric Phase Lens for Realizing a Bi-focal Integral Floating Display Without a Color Breaking, 2020, pp. 1-2 [online], [retrieved Sep. 6, 2024], retrieved from Internet <URL: https://ieeexplore.ieee.org/stamp/stamp.jsp?tp=&arnumber . . . >. (Year: 2020).*
Wei Tang Chen et al., Flat Optics with Dispersion-engineered Metasurfaces, 2020, pp. 1-17 [online], [retrieved Jul. 9, 2024], retrieved from the Internet <URL: https://faculty.cas.usf.edu/mkkim/papers.pdf/2013%20OPN%20MKKim.pdf>. (Year: 2020).*
James C. Wyant, Geometric Phase Shifter, 2016, pp. 1-16 [online], [retrieved [Mar. 7, 2023], retrieved from the Internet <URL: https://wp.optics.arizona.edu/jcwyant/wp-content/uploads/sites/13/2016/08/Geometric_Phase_Shifter.pdf>. (Year: 2016).*
Tatsuki Tahara et al., Single-shot Phase-shifting Incoherent Digital Holography, 19 Journal of Optics 065705-1 to 065705-8 (2017). (Year: 2017).*
KiHong Choi et al., Self-interference Digital Holography with a Geometric-phase Hologram Lens, 42 Optics Letters 3940-3943 (2017). (Year: 2017).*
Teruyoshi Nobukawa et al, Single-short Phase-shifting Incoherent Digital Holography with Multiplexed Checkerboard Phase Gratings, 43 Optics Letters 1698-1701 (2018). (Year: 2018).*
KiHong Choi et al., Self-interference Digital Holographic Camera Using Geometrical Phase Lens, 2018, pp. 1-4 [online], [retrieved Mar. 8, 2025], retrieved from the Internet <URL: https://ieeexplore.ieee.org/stamp/stamp.jsp?tp=&arnumber=8326172>. (Year: 2018).*
KiHong Choi et al., Achromatic Phase Shifting Self-Interference Incoherent Digital Holography Using Linear Polarizer and Geometric Phase Lens, 26 Optics Express 16212-16225 (2018). (Year: 2018).*
Choosing a Wave Plate, 2020, pp. 1-2 [online], [retrieved Mar. 7, 2025], retrieved from the Internet URL: https://web.archive.org/web/20200922015443/https://www.thorlabs.com/newgrouppage9.cfm?objectgroup_id=10777>. (Year: 2020).*
KiHong Choi et al, "Self-Interference digtial holography with a geometric-phase hologram lens," Department of Information Display, Kyung Hee University, Seoul, Korea, Jul. 28, 2017.
Korean Office Action for Application No. 1020210029454 dated Dec. 16, 2022.
Chinese Office Action for Application No. 202210232376 dated Jun. 29, 2023.

* cited by examiner

○ RCP: focusing(50%)
○ LCP: collimating(50%)

Liquid-crystal-based polarization controller concept

FIG. 8B

HOLOGRAPHIC CAMERA SYSTEM

CROSS-REFERENCE TO RELATED APPLICATIONS

This U.S. non-provisional patent application claims priority under 35 U.S.C. § 119 to Korean Patent Application No. 10-2021-0029454, filed on Mar. 5, 2021, the entire contents of which are incorporated by reference herein.

This application was supported by Electronics and Telecommunications Research Institute (ETRI) grant funded by ICT R&D program of MSIT/IITP[2019-0-00001, Development of Holo-TV Core Technologies for Hologram Media Services.

TECHNICAL FIELD

The example embodiments relate to a holographic camera system. More specifically, the example embodiments relate to a holographic camera system using a geometric phase lens based on a $\lambda/4$ phase delay pattern.

BACKGROUND

The holographic camera technology based on natural light is a technology that may acquire wavefront information about the scattered light of an object even with an incoherent optical source. The key element of a holographic camera using such an incoherent optical source includes an optical element for separation and modulation of the incident wavefront, and a phase shift system for removing multiple pairs of images and noise information from the light source. Holographic camera technology, for example, may use a Fresnel Incoherent Correlation Hologram (FINCH) system using active liquid crystal elements and birefringent lenses, a Self-Interference Incoherent Digital Holography (SIDH) system in which a wavefront separator is applied to an interferometer or the like, according to the implementation principle.

The FINCH system uses a first polarizer to split incident light into vertical/horizontal polarization, a spatial light modulator to modulate only the wavefront of a specific polarization component of the incident polarized light from the polarizer, and a second polarizer to generate an interference fringe, that is, a hologram from the two wavefronts with a slight difference in curvature from the spatial light modulator. A diffractive lens pattern is placed on the spatial light modulator, and while this lens pattern sequentially phase modulating, reproducing and recording the corresponding hologram may obtain a complex hologram with reduced noise by removing the pair image and light source information. However, because spatial light modulators, liquid crystal lenses, and birefringent lenses have color dispersion characteristics for various wavelengths, and requires one or more optoelectronic devices in addition to the imaging sensor, there are disadvantages in the complexity of system configuration and operation, and the need for more power consumption than a system consisting of only passive elements.

Figure 1:
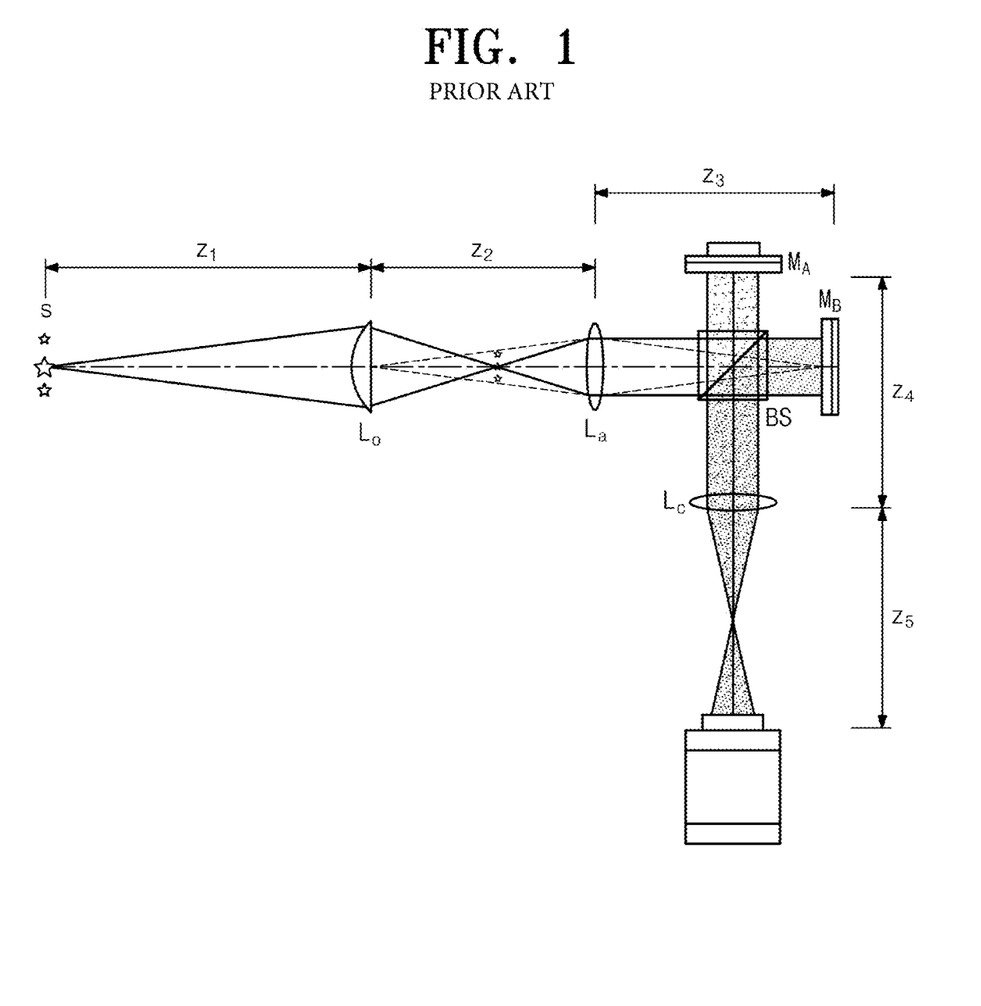
FIGS. 1 and 2 are diagrams for explaining a conventional holographic camera system.

FIG. 1 shows an example diagram of a SIDH system. Incident light is separated in transmission and reflection directions by a wavefront splitter on a Michelson interferometer. The two wavefronts are modulated and reflected by mirrors of different curvature. After that, if passing through the wavefront separator again, the traveling directions of the two wavefronts are the same, and a hologram due to the interference of the two waves is recorded on the image sensor. However, since the structure has two optical paths, the volume of the system increases, and it may be vulnerable to external vibration. In addition, for the phase shift, one mirror was moved stepwise using a piezo element, and this has the disadvantage of being sensitive to external impact and re-adjusting the movement range according to the wavelength of the incident light.

Figure 2:
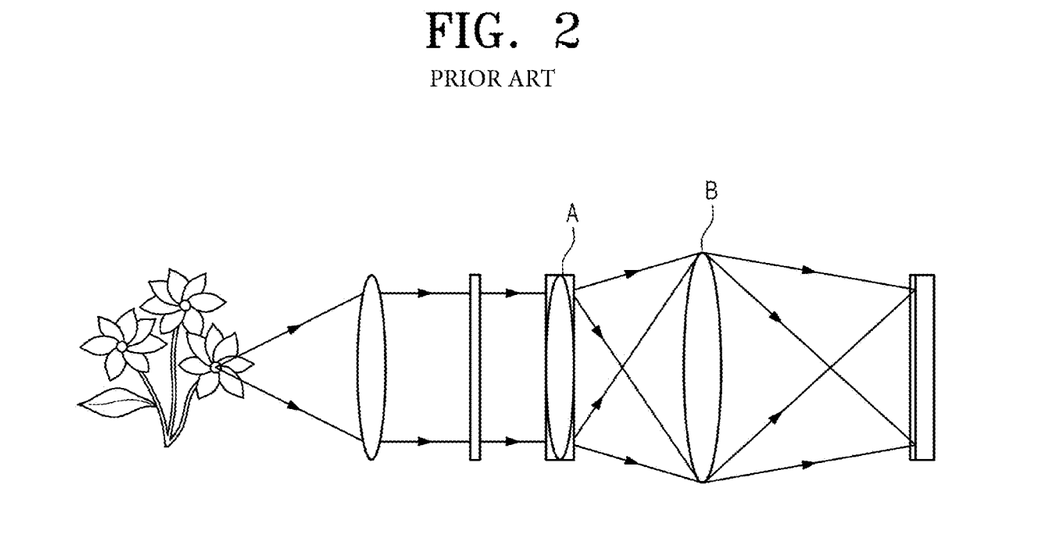

FIG. 2 shows another example of the configuration of a conventional holographic camera. FIG. 2 illustrates an example of a recording optical system using a half-wave plate (HWP) GPH lens A having a phase delay of $\lambda/2$. However, in this recording optical system, when linear polarization passes through a geometric phase lens, it is separated and modulated to LCP 50% (focusing) and RCP 50% (defocusing). In this case, in the case of the RCP wave, there is a beam that is lost when the RCP wave reaches the image sensor due to a defocusing characteristic. To solve this, in addition to the basic structure, various lens groups B should be added to adjust magnification or interference efficiency, and such an additional optical system increases the volume of the entire optical system, and has a disadvantage in that noise is generated due to an error of the lens optical system.

SUMMARY

Some example embodiments according to the inventive concept provide a holographic camera system with high polarization efficiency compared to the existing holographic camera system.

Some example embodiments according to the inventive concept provide a holographic camera system using a geometric phase lens having a phase delay of $\lambda/4$.

In an embodiment, the holographic camera system may comprise: an imaging lens; a polarizer configured to circularly polarize light incident from the imaging lens; a geometric phase lens with a phase delay of $\lambda/4$; and an image sensor configured to replicate an interference pattern through self-interference of light transmitted from the geometric phase lens.

In an embodiment, the imaging lens, the polarizer, the geometric phase lens, and the image sensor may be arranged sequentially.

In an embodiment, the geometric phase lens and the image sensor may be spaced apart by a certain distance as to cause self-interference of the light transmitted from the geometric phase lens.

In an embodiment, the geometric phase lens may transmit 50% of the light incident from the polarizer with the same polarization component as the incident light, and transmit the remaining 50% of the light incident from the polarizer to a polarization component that modulated the incident light.

In an embodiment, the polarizer may change an optical axis of a polarizing plate included in the polarizer according to an applied voltage.

In an embodiment, the polarizer may change the optical axis of a polarizing plate included in the polarizer according to an on/off of a switch connected to the polarizer.

In an embodiment, the polarizer may include a linear polarization polarizing plate and a phase delay polarizing plate of $\lambda/4$.

In an embodiment, the polarizer may include a linearly polarized polarizing plate and a polarization rotating device capable of adjusting the polarization angle of the linearly polarized polarizing plate.

BRIEF DESCRIPTION OF THE DRAWINGS

The accompanying drawings are included to provide a further understanding of the inventive concept and are incorporated in and constitute a part of this specification. The drawings illustrate embodiments of the inventive concept and, together with the description, serve to explain principles of the inventive concept. In the drawings.

DETAILED DESCRIPTION

The terms used in this specification and the accompanying drawings are for easy description of the inventive concept, and thus the inventive concept is not limited by the terms and drawings.

Among the techniques used in the inventive concept, detailed descriptions of known techniques that are not closely related to the spirit of the inventive concept will be omitted.

The inventive concept is described more fully hereinafter with reference to the accompanying drawings, in which embodiments of the inventive concept are shown. This inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art. In the drawings, the size and relative sizes of layers and regions may be exaggerated for clarity. Like numbers refer to like elements throughout.

"Including" a certain component means that other components may be further included, rather than excluding other components, unless otherwise stated. In particular, the term "include," "comprise," "including," or "comprising," specifies a property, a region, a fixed number, a step, a process, an element and/or a component but does not exclude other properties, regions, fixed numbers, steps, processes, elements and/or components.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Terms "unit", "block", "module", and the like may be used to indicate a unit of processing at least one function or operation. For example, such terms unit", "block", and "module" may mean software, or a hardware element such as ASIC or FPGA. However, such terms are not limited to software or hardware. The "unit", "block", and "module" may be configured to be included within an addressable storage medium or to operate one or more processors. Thus, "unit", "block", and "module" may include constituent elements such as software elements, Object-Oriented software elements, class elements, and task elements, processes, functions, attributes, procedures, sub-routines, segments of program code, drivers, firmware, micro code circuit, data, database, data structures, tables, arrays, and variables. Elements and functions provided within the "unit", "block", and "module" may be jointed to reduce the number of elements and the "unit", "block", and "module", or may be additionally divided into elements and "unit", "block", and "module".

A holographic camera system according to the inventive concept, spatial intensity information and spatial phase information of the light incident on the camera unit after being backscattered from a holographic imaging target object used to measure a depth image of an object to be photographed is recorded as intensity information in an image sensor by a holographic camera. At this time, unlike conventional holographic cameras where a coherent laser light source must be irradiated to a target object to be measured in order to record spatial intensity information and phase information of light backscattered from the target object, the holographic camera system according to example embodiments of the inventive concept is designed to have a phase delay of $\lambda/4$, so that due to the self-interference effect of the two lights, which shows 50% of the condensing diffraction efficiency, spatial intensity information and phase information of light backscattered from a target object may be recorded even if the normal natural light, which is an incoherent optical source, is irradiated to the measurement target. Hereinafter, the holographic camera system according to the inventive concept will be described in more detail.

Figure 3:
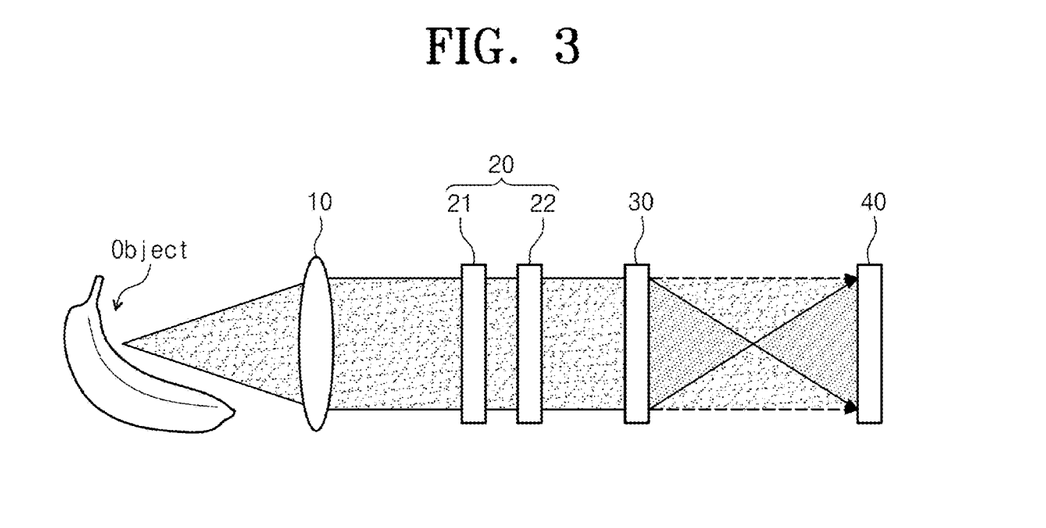
FIG. 3 is a view for explaining a holographic camera system according to an embodiment of the inventive concept.

FIG. 3 is a view for explaining a holographic camera system 1 according to an embodiment of the inventive concept.

The inventive concept proposes the holographic camera system 1 including a geometric phase lens 30 in which an optical axis is spatially patterned while having a phase delay of $\lambda/4$.

The holographic camera system 1 according to the inventive concept may include an imaging lens 10, a polarizer 20, a geometric phase lens 30, and an image sensor 40.

The imaging lens 10 may serve to transmit light containing information on an object to be photographed to the polarizer 20. The polarizer 20 may change light containing information incident from the imaging lens 10 into a specific polarization. According to an example, the polarizer 20 may be a circular polarization (CP). A detailed example of the polarizer 20 will be described below.

The geometric phase lens 30 may be a geometric phase lens whose collection efficiency is 50% for incident circularly polarized light. The geometric phase lens 30 has a phase delay of $\lambda/4$ to induce a wavefront modulation characteristic and self-interference while having a lens collection efficiency of up to 50% for incident circularly polarized light. The image sensor 40 may recognize a pattern formed through self-interference in the geometric phase lens 30. According to one example, the image sensor 40 according to the inventive concept uses a polarized image sensor 40 in which the transmission axis is periodically patterned at 0 degrees 45 degrees, 90 degrees, and 135 degrees for each pixel such that it is possible to extract phase information as intensity information from each pixel configuration set, and through this self-interference pattern, it is possible to obtain a complex hologram, which is wavefront information of an object.

In more detail, the operation of the holographic camera system according to the inventive concept will be described as follows. The wavefront of backscattered natural light at different depth points on the surface of the object to be measured has phase information on the surface of each object and enters the camera, and first passes through the imaging lens 10 functioning as an imaging optical system. Thereafter, the scattered light of the object surface having a non-polarized light characteristic passes through the polarizer 20 to modulate the polarization state into a left circularly polarized light or a right circularly polarized light state. At this time, the polarizer 20 may modulate the incident light into circularly polarized light. According to one example, the polarizer 20 may include a linear polarizing plate 21 and a phase delay polarizing plate by $\lambda/4$. According to one example, the transmission axis of the linear polarizing plate 21 included in the polarizer 20 and the optical axis of the phase delay polarizing plate by $\lambda/4$ may form a mutual 45 degree angle. According to another example of the inventive concept, the polarizer 20 uses an achromatic $\lambda/4$ phase delay polarizing plate to remove the color dispersion characteristic, thereby preventing distortion of the circularly polarized light modulation characteristic according to the wavelength.

According to another example of the inventive concept, the $\lambda/4$ phase delay polarizing plate included in the polarizer 20 may be implemented as a polymer film having a birefringence characteristic.

The scattered light of the object surface after passing through the polarizer 20 passes through the geometric phase lens 30, and is divided into a diffraction term (converging (or diverging) focusing beam) and a non-diffractive zeroth term (collimating beam) depending on the polarization component of the light.

As the two light waves with the wavefront separated in this way pass through the geometric phase lens 30, the non-diffractive zeroth term becomes the incident circularly polarized light state, that is, the unchanged polarization state, and the diffraction term is converted into an orthogonal polarization state for incident circularly polarized light with wavefront modulation characteristics as a converging or diverging lens. According to an example, the diffraction term may be modulated into right circularly polarized light when left circularly polarized light is incident.

That is, since these two wavefronts are incident on the image sensor 40 at the same time and the lens thickness of the geometric phase lens 30, which causes wavefront separation and wavefront modulation, is very thin, although natural light is used, it is possible to form a polarization interference pattern in the image sensor 40 through self-interference owing to a low optical path difference. At this time, since the two wavefronts are in a mutually orthogonal state, i.e., right circularly polarized light and left circularly polarized light, a polarization interference pattern is formed on the plane of the image sensor 40 in the form of spatially modulated linear polarization vectors according to the relative phase value of the scattered light of the object surface.

Equation (1) below is an equation representing optical characteristics when light having an arbitrary polarization is incident on the geometric phase lens 30. Light with arbitrary polarization is separated and phase-modulated into left circularly polarized light and right circularly polarized light components by the geometric phase lens 30 and is diffracted, and according to the phase delay value of the geometric phase lens 30, the zero-order term in which the incident polarization is maintained without diffraction is determined.

$$e^{i\delta_{in}} |\chi_{in}\rangle \xrightarrow{GPH} \sqrt{\eta_+} e^{i(\delta_{in}+2\Phi)} |\chi_+\rangle + \sqrt{\eta_-} e^{i(\delta_{in}-2\Phi)} |\chi_-\rangle + \sqrt{\eta_0} e^{i\delta_{in}} |\chi_{in}\rangle. \quad (1)$$

That is, the 0th order term and the diffracted term according to the phase delay value of the geometric phase lens 30 are defined as in Equations (2) and (3) below. That is, according to the following equations, if the phase delay value of the geometric phase lens 30 has a value of $\lambda/4$, the zero-order term and the diffracted term may be separated with an efficiency of 50% respectively.

$$\eta_o = \cos^2\left(\frac{\pi \Delta nd}{\lambda}\right) \quad (2)$$

$$\eta_{\pm 1} = \frac{1}{2}[1 \mp S'_3]\sin^2\left(\frac{\pi \Delta nd}{\lambda}\right) \quad (3)$$

Therefore, when left circularly polarized light LCP is incident on the geometric phase lens 30, 50% of the incident light is diffracted and focused while changing to the right circularly polarized light RCP, and the remaining 50% is transmitted while maintaining the polarized light as left circularly polarized light LCP. As described above, there is an effect that the pattern of the QWP condition may be replicated equally by using two lights with an intensity of 50:50 divided into a left circularly polarized light and a right circularly polarized light. This is shown in FIG. 5(a).

Figure 5A:
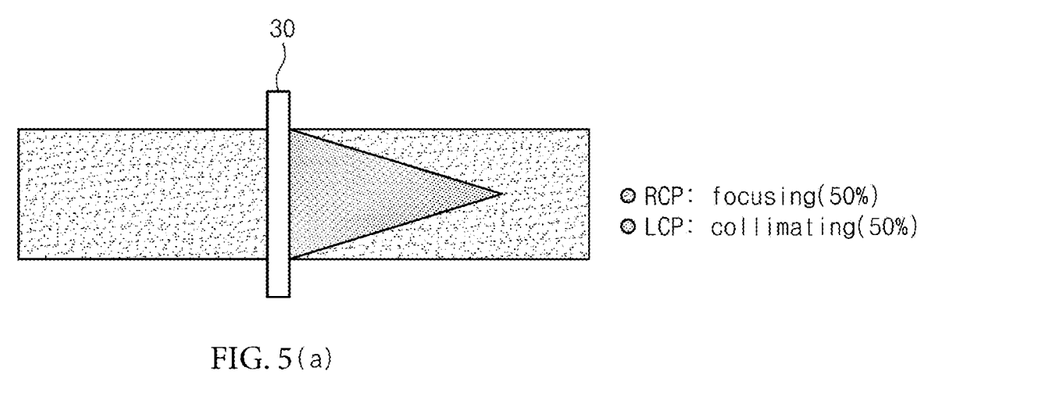
FIGS. 5(a) and 5(b) are diagrams for explaining the characteristics of a geometric phase lens according to an example of the inventive concept and a conventional geometric phase lens.

FIG. 5(a) shows the characteristics of light of a beam when a plane wave is vertically incident on a geometric phase lens 30 having a $\lambda/4$ phase delay. It may be seen that the wavefront is separated and modulated, i.e., the incident light with left circularly polarized light LCP is separated into the modulated right circularly polarized light RCP (focusing bema) and the unmodulated left circularly polarized light LCP (collimating beam).

Figure 4A:
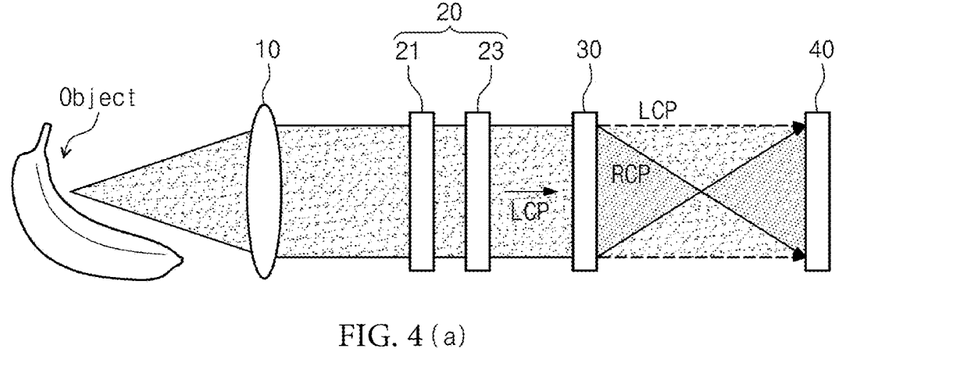
FIGS. 4(a) and 4(b) are views for explaining a holographic camera system according to another embodiment of the inventive concept.
Figure 4B:
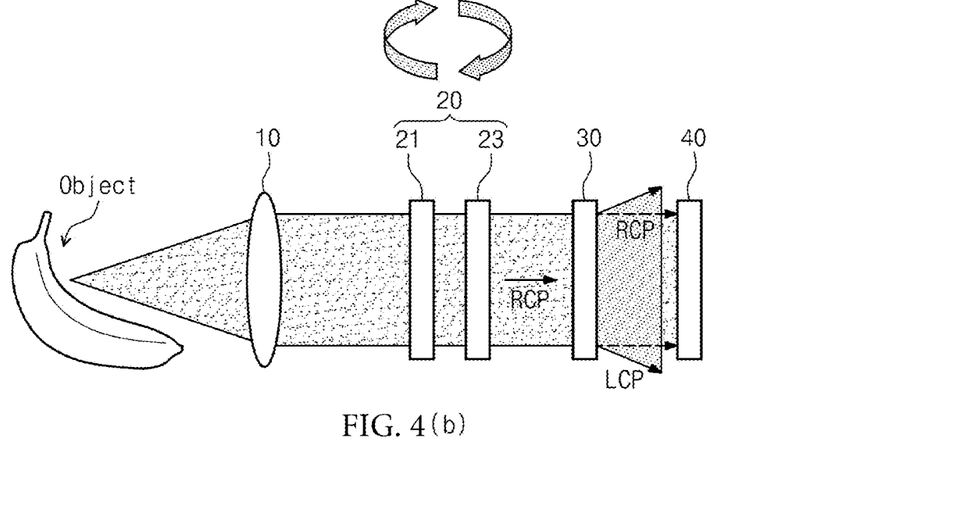

FIGS. 4(a) and 4(b) are views for explaining a holographic camera system according to another embodiment of the inventive concept.

The holographic camera system according to FIGS. 4(a) and 4(b) are different from FIG. 3 in one configuration of the polarizer 20.

According to an example of FIGS. 4(a) and 4(b), the polarizer 20 may configure an electrically switchable $\lambda/4$ phase delay polarizing plate by using the polarizing plate 23 in which the birefringence characteristic may be electrically modulated. The $\lambda/4$ phase delay polarizing plate 23 of the polarizer 20 according to an example of FIGS. 4(a) and 4(b) may be a liquid crystal device capable of electrically switching an optical axis. Through this, it may be implemented as a selective switching module that may convert the polarization characteristics of the transmitted beam to LCP or RCP.

According to an example in FIG. 3, the polarization state after passing through the polarizer 20 according to the inventive concept is determined depending on whether the relative angle of the transmission axis of the linear polarizing plate 21 and the optical axis of the $\lambda/4$ polarizing plate is +45 degrees or −45 degrees, that is, the polarization state may be left circularly polarized light or right circularly polarized light according to the relative value.

However, in the case of configuring the λ/4 polarizing plate 23 of the polarizer 20 using a liquid crystal element capable of electrical switching as in the embodiment of FIGS. 4(a) and 4(b), the polarization state may be left circularly polarized light or right circularly polarized light according to a voltage state applied to the liquid crystal layer. That is, it is possible to selectively apply left circularly polarized light or right circularly polarized light. This may be determined according to a voltage state applied to the liquid crystal layer or whether a switch connected to the liquid crystal layer is turned on or off.

In the case of using the phase delay polarizing plate 23 in which the polarization characteristic may be changed as described above, there is an effect that different modes may be selected according to the imaging conditions of the holographic camera. According to an example, an appropriate polarization characteristic may be selected according to imaging conditions such as information on a light source and a distance to an object.

In the case of FIG. 4(a), when the switch of the liquid crystal element 23 is turned off and thus the beam of the LCP is incident on the geometric phase lens 30, the incident beam is modulated and separated into a focusing beam RCP and a collimating beam LCP to form an interference pattern on the image sensor 40. In this case, since it is an imaging method through self-interference between a focused beam and a collimating beam, there is an effect that may have high interference efficiency. In the case of FIG. 4(b), when the liquid crystal element 23 is switched on and thus the RCP beam is incident on the geometric phase lens 30, the incident beam is modulated and separated into a defocusing beam LCP and a collimating beam RCP to form an interference pattern on the image sensor 40. In this case, since self-interference between the defocused beam and a collimating beam is used, the distance on the image sensor 40 may be reduced, thereby reducing the optical path difference.

That is, by suitable selecting the polarization state of the incident light according to imaging conditions using the polarizing plate 23 that electrically modulates the birefringence characteristic as in the embodiment of FIG. 4, there is an effect of selecting an efficient mode in terms of high interference efficiency (e.g., FIG. 4(a)) or optical path difference (e.g., FIG. 4(b)).

In relation to the holographic camera system according to the inventive concept, when the beam passing through the polarizer 20 (circular polarizer CP) passes through the λ/4 phase delay geometric phase lens 30, it may be split/modulated into a 50% focusing beam (right circularly polarized light) and 50% collimating beam (left circularly polarized light). In contrast to the conventional defocusing beam, the collimated beam may not a beam loss when it reaches the image sensor 40 and has the effect of obtaining high polarization interference efficiency.

Figure 5B:
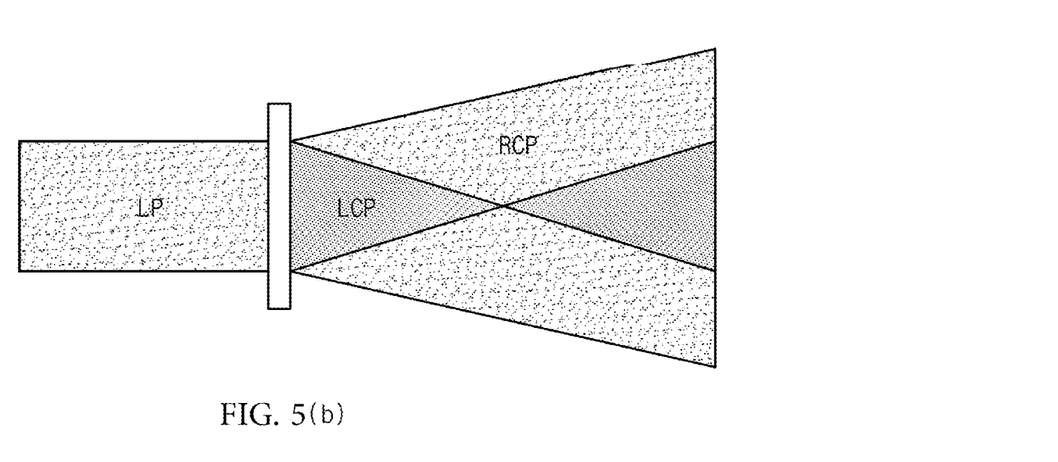

FIGS. 5(a) and 5(b) are diagrams for explaining the characteristics of the geometric phase lens 30 according to an example of the inventive concept and the conventional geometric phase lens, respectively.

The conventional geometric phase lens as shown in FIG. 5(b) is manufactured under the HWP (λ/2) phase delay condition, which is the ideal diffraction efficiency condition with the optical layer birefringence, and since the camera system using the conventional geometric phase lens uses these HWP (λ/2) GP lenses, in order to use the polarization-dependent wavefront separation characteristic, the incident light is a linear polarization LP. At this time, the incident linear polarization LP is separated into LCP (having focusing characteristics) and RCP (having defocusing characteristics), respectively, polarization interference is formed on the sensor. That is, the linear polarization forms a converging wavefront and a diverging wavefront, respectively, to form self-interference in the image sensor 40 as shown in FIG. 5(b).

In the case of the inventive concept, by using a λ/4 geometric phase lens 30 as shown in FIG. 5(a), in contrast to the λ/2 geometric phase lens, the thickness of the optically anisotropic material constituting the optical material is thin, and accordingly, compared to the conventional geometric phase lens 30, it is possible to manufacture a large area on the same specification and have high diffraction efficiency.

Figure 6:
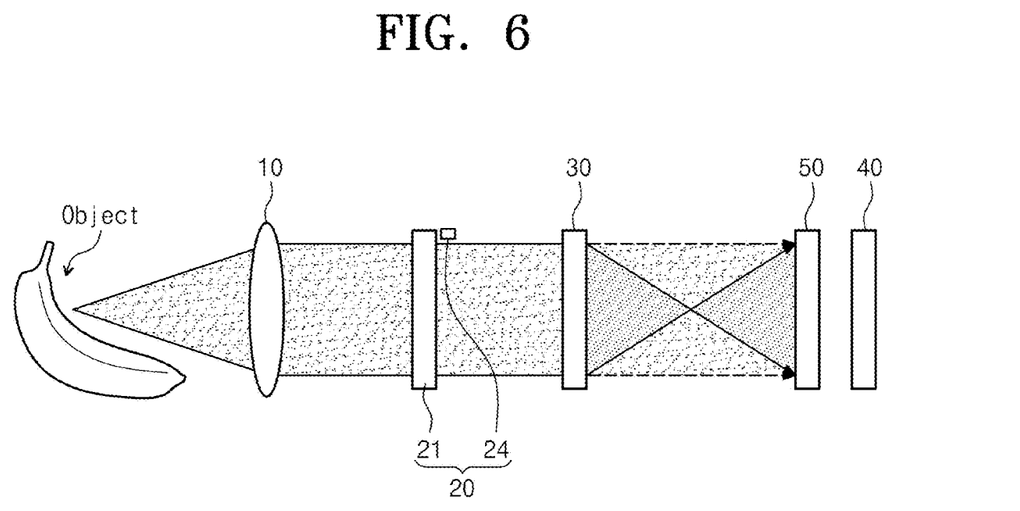
FIGS. 6 and 7 are views for explaining a holographic camera system according to another embodiment of the inventive concept.
Figure 7:
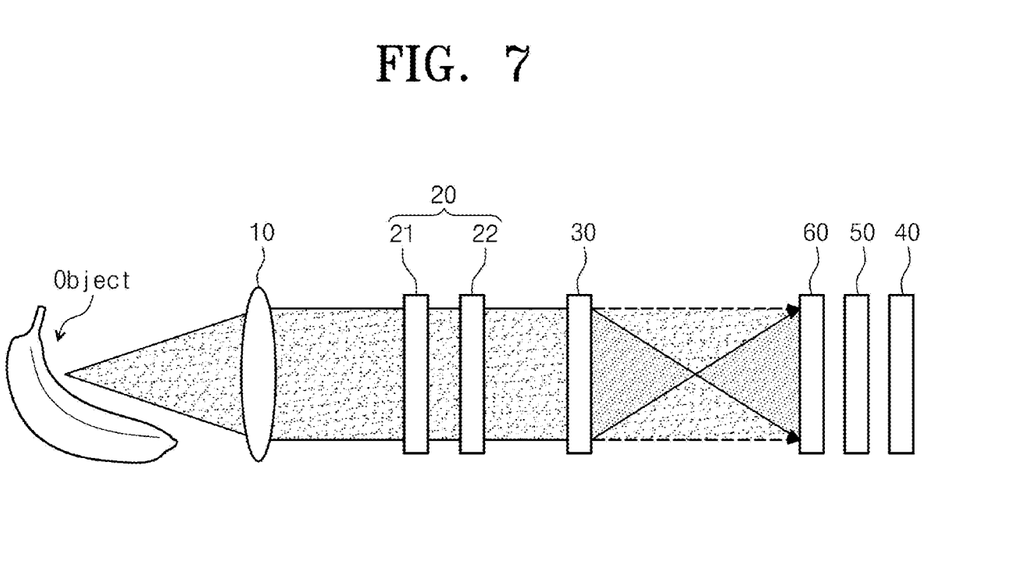

FIGS. 6 and 7 are views for explaining a holographic camera system according to another embodiment of the inventive concept.

Referring to FIG. 6, the polarizer 20 of the holographic camera system according to another embodiment of the inventive concept may further include a polarization rotating device 24. According to one example, the polarization rotating device 24 may be combined with the linear polarizing plate 21 to control the polarization angle of the linear polarizing plate.

According to the embodiment of FIG. 6, by using the geometric phase lens and the polarization rotating device 24 capable of mechanically rotating polarization, there is an effect that an image may be obtained without a polarization image sensor.

In the case of the conventionally implemented holographic camera, by rotating the polarizing plate at the front or rear end of the geometric phase lens by 0 degree, 45 degree, 90 degree, and 135 degrees to obtain phase information, there was a problem in that four holographic images had to be taken after changing the angle of the incident polarization. This structure has the advantage of being able to acquire a holographic image with 4 times higher resolution compared to a structure to which a polarized image sensor is applied, but because the polarizing plate has to be rotated mechanically, the overall optical system is enlarged, and due to the slow response speed, real-time holographic image shooting is not possible.

According to an embodiment of the inventive concept, by including a polarization rotating device 24 that may automatically switch the angle of the polarizing plate included in the polarizer, there is an effect that the entire optical system is not enlarged and, at the same time, a high-resolution holographic image may be obtained.

FIG. 7 shows a holographic camera system that may be acquired without a polarization image sensor, using a geometric phase lens and a liquid crystal-based polarization controller.

Referring to FIG. 7, it is possible to generate the same effect as placing a λ/4 phase delay polarizing plate QWP through angle adjustment of the polarization rotating device, and by additionally including the liquid crystal-based polarization controllers 50 and 60 capable of high-speed switching in the system, compared to the case where HWP (λ/2 GP lens) is applied, it has the advantage of being able to reduce weight and remove noise.

Figure 8A:
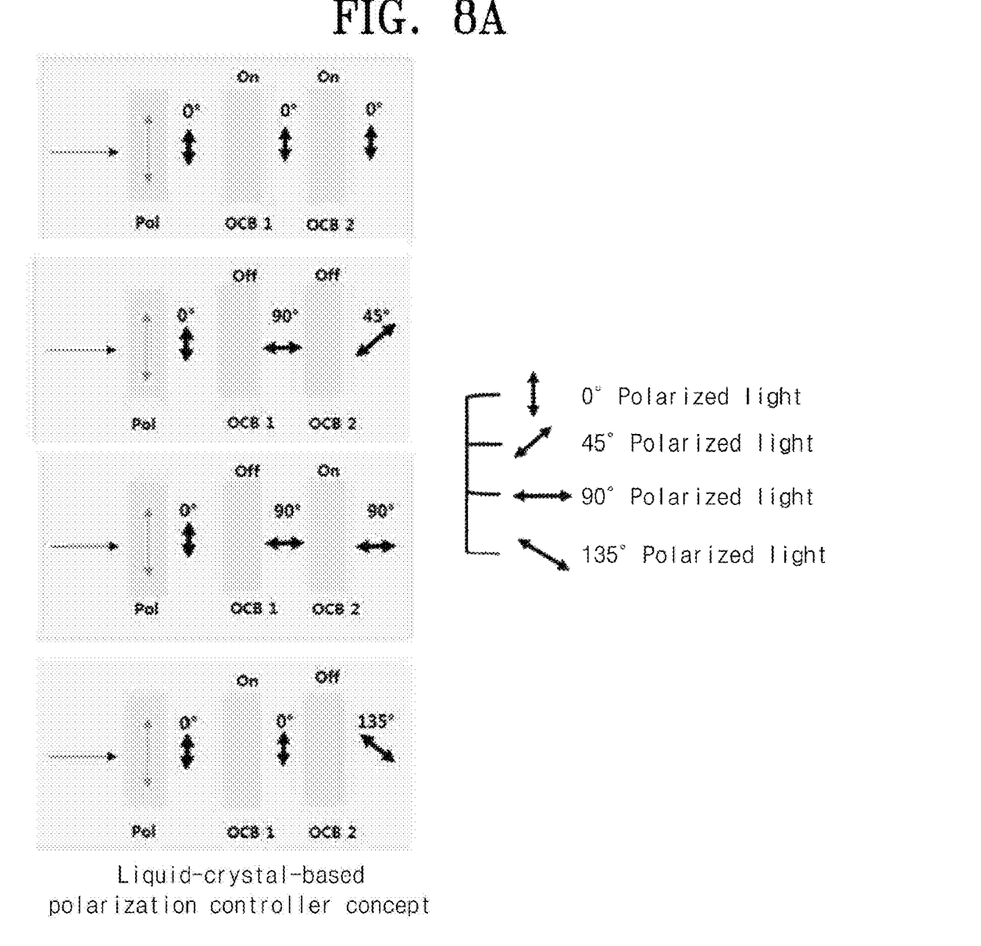
FIGS. 8(a) and 8(b) are views for explaining the principle of the holographic camera system according to FIGS. 6 and 7.
Figure 8B:
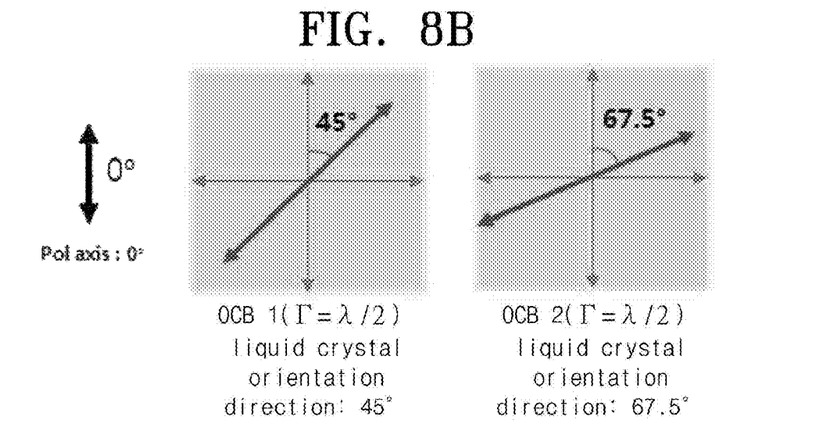

FIGS. 8(a) and 8(b) are views for explaining the principle of the holographic camera system according to FIGS. 6 and 7.

FIGS. 8(a) and 8(b) show the operating principle of the liquid crystal-based polarization controller. In the case of the liquid crystal-based polarization controller, two optically compensated bend (OCB) cells with fast response speed are stacked.

At this time, since the OCB cells have different orientation directions at 45 degrees and 67.5 degrees, respectively, depending on the on-off combination of the voltages of the two stacked OCB cells, it is possible to change the incident polarization direction to 0 degrees, 45 degrees, 90 degrees, and 135 degrees in the same way as the existing polarizing plate rotation method. This is shown in FIG. 8(a).

Therefore, when a liquid crystal-based high-speed switching polarization controller is applied, as two beams separated by a λ/4 GP lens meet and form an axis of an interference pattern on the sensor, it may be rotated with a very fast response speed (<450 us), compared to a holographic camera that mechanically rotates polarized light as in conventional art, there is an effect of acquiring real-time holographic image information.

In addition, with the introduction of the λ/4 GP lens structure, like the λ/4 GP lens and polarization image sensor-based holographic optical system described above, the beam lost when reaching the sensor may be avoided, and high polarization interference efficiency may be obtained.

When using the holographic camera system according to the inventive concept, using a phase delay lens with a phase delay of λ/4, there is an effect that may implement a holographic system that may have high polarization interference efficiency compared to a conventional holographic camera. In addition, compared to the existing optical system, since it does not require an additional optical system to increase the interference efficiency, it has the effect of reducing the size of the holographic camera and eliminating interference noise caused by lens design errors. And, as the optical element of the geometric phase holographic lens has a small thickness, compared to the existing lens, it is possible to manufacture a device with a large diameter at the focal length under the same conditions, such that there is an effect that may have high light efficiency. In addition, since the phase delay polarizing plate of λ/4 included in the polarizer 20 may be replaced with a liquid crystal element that may change the optical axis of the material according to the voltage, it is possible to convert the characteristics of the geometric phase lens 30 into two functions: a convex lens and a concave lens function, and there is a practical advantage in that the two recording optical systems may be switched according to the holographic camera imaging concept and conditions, and there is a usable effect.

In addition, according to the inventive concept, even when a λ/4 GP lens is applied to a holographic camera system applied without a conventional polarization image sensor, similarly, it is possible to reduce interference noise due to camera miniaturization and lens design errors and have high optical efficiency. Accordingly, it is possible to improve the optical system by applying the corresponding λ/4 GP lens to both of the existing two GP-SIDH systems (polarized image sensor-based and rotational polarizer-based holographic cameras).

In addition, when a λ/4 GP lens and a high-speed polarization switching element are applied, at the same time, it is possible to acquire high-resolution images that may be acquired in real time without a polarization image sensor, and by using the λ/4 GP lens, the holographic camera may be miniaturized and lens design errors may be eliminated.

According to the inventive concept, a holographic system having high polarization interference efficiency may be implemented.

According to the inventive concept, as compared to the existing optical system, an additional optical system for increasing the interference efficiency is not required, and it is possible to reduce the size of the holographic camera and to remove interference noise due to a lens design error, and it may have high light efficiency.

The effects of the inventive concept are not limited to the above-described effects, and effects not mentioned will be clearly understood by those of ordinary skill in the art from the present specification and the accompanying drawings.

Although the embodiments of the inventive concept have been described, it is understood that the inventive concept should not be limited to these embodiments but various changes and modifications may be made by one ordinary skilled in the art within the spirit and scope of the inventive concept as hereinafter claimed.

The invention claimed is:

1. A holographic camera system comprising:
   an imaging lens;
   a polarizer configured to modulate light incident from the imaging lens into circularly polarized light, wherein the polarizer comprises a linear polarization polarizing plate and an achromatic phase delay polarizing plate of λ/4;
   a geometric phase lens with a phase delay of λ/4, the geometric phase lens being configured to divide the circularly polarized light into a combination of a collimating beam and one of a focusing beam or a diverging beam, wherein the selection of the focusing or diverging beam is dependent on a polarization state of the incident circularly polarized light, and wherein the geometric phase lens is configured to divide the circularly polarized light substantially independently of wavelength; and
   an image sensor configured to replicate an interference pattern through self-interference of light output from the geometric phase lens.

2. The holographic camera system of claim 1, wherein the imaging lens, the polarizer, the geometric phase lens, and the image sensor are arranged sequentially.

3. The holographic camera system of claim 2, wherein the geometric phase lens and the image sensor are spaced apart by a distance as to cause self-interference of light transmitted from the geometric phase lens.

4. The holographic camera system of claim 1, wherein the geometric phase lens is configured to transmit 50% of the light incident from the polarizer with the same polarization component as the incident light, and to transmit a remaining 50% of the light incident from the polarizer with a different polarization component from the incident light by modulating the incident light.

5. The holographic camera system of claim 4, wherein the polarizer is configured to change an optical axis of a polarizing plate included in the polarizer according to an applied voltage.

6. The holographic camera system of claim 4, wherein the polarizer is configured to change an optical axis of a polarizing plate included in the polarizer according to an on/off of a switch connected to the polarizer.

7. The holographic camera system of claim 4, wherein the polarizer comprises a linearly polarized polarizing plate and a polarization rotating device for adjusting a polarization angle of the linearly polarized polarizing plate.

8. The holographic camera system of claim 1, wherein the image sensor comprises a polarized image sensor that is configured to extract phase information as intensity information from each of a plurality of pixel configuration sets.

* * * * *